United States Patent
Pater et al.

(10) Patent No.: US 10,155,825 B2
(45) Date of Patent: Dec. 18, 2018

(54) CATALYST COMPONENTS FOR THE POLYMERIZATION OF OLEFINS

(75) Inventors: Joachim T. M. Pater, Ferrara (IT); Dario Liguori, Ferrara (IT); Gianni Vitale, Ferrara (IT); Gianni Collina, Ferrara (IT); Diego Brita, Ferrara (IT); Tiziano Dall'Occo, Ferrara (IT); Giampiero Morini, Ferrara (IT)

(73) Assignee: Basell Poliolefine Italia S.r.l., Milano (IT)

(*) Notice: Subject to any disclaimer, the term of this patent is extended or adjusted under 35 U.S.C. 154(b) by 398 days.

(21) Appl. No.: 13/818,626

(22) PCT Filed: Aug. 10, 2011

(86) PCT No.: PCT/EP2011/063730
§ 371 (c)(1),
(2), (4) Date: Feb. 22, 2013

(87) PCT Pub. No.: WO2012/025379
PCT Pub. Date: Mar. 1, 2012

(65) Prior Publication Data
US 2013/0158214 A1 Jun. 20, 2013

Related U.S. Application Data

(63) Continuation-in-part of application No. 12/806,892, filed on Aug. 24, 2010, now abandoned.

(30) Foreign Application Priority Data

Sep. 2, 2010 (EP) .................................... 10175027

(51) Int. Cl.
*C08F 4/649* (2006.01)
*C08F 10/00* (2006.01)
*C08F 4/46* (2006.01)
*C08F 210/16* (2006.01)

(52) U.S. Cl.
CPC ................ *C08F 4/46* (2013.01); *C08F 10/00* (2013.01); *C08F 4/6494* (2013.01); *C08F 210/16* (2013.01)

(58) Field of Classification Search
CPC ...... C08F 4/44; C08F 4/46; C08F 4/50; C08F 4/64; C08F 4/6494; C08F 10/00; C08F 10/02; C08F 10/06; C08F 210/16

USPC .......................................................... 502/126
See application file for complete search history.

(56) References Cited

U.S. PATENT DOCUMENTS

| 4,229,558 | A | * | 10/1980 | Kakogawa | ............. | C08F 10/00 |
|||||||526/125.6|
| 4,298,718 | A | | 11/1981 | Mayr et al. | | |
| 5,990,251 | A | * | 11/1999 | Gelus | ......................... | 526/125.7 |
| 6,127,304 | A | | 10/2000 | Sacchetti et al. | | |
| 7,427,653 | B2 | | 9/2008 | Brita et al. | | |
| 7,592,286 | B2 | | 9/2009 | Morini et al. | | |
| 7,678,867 | B2 | | 3/2010 | Baita et al. | | |
| 7,932,206 | B2 | | 4/2011 | Brita et al. | | |
| 2006/0089251 | A1 | * | 4/2006 | Brita | ...................... | C08F 10/00 |
|||||||502/123|
| 2010/0029869 | A1 | | 2/2010 | Morini et al. | | |

FOREIGN PATENT DOCUMENTS

| CN | 1062538 A | 7/1992 | | |
| SU | 403194 A3 | 10/1973 | | |
| WO | WO 2004106388 A2 * | 12/2004 | ............. | C08F 4/651 |

OTHER PUBLICATIONS

PCT International Search Report & Written Opinion dated Nov. 10, 2011, for PCT/EP2011/063730.
Scitentific Reports, "Crystal Structure of Graphite Under Room-Temperature Compression and Decompression" by Yuejian Wang, Joseph E. Panzik, Boris Kiefer & Kanani K.M. Lee Dated May 2, 2012.
Science Direct, "Ziegler-Natta Catalysts for Propylene Polymerization: Morphology and Crystal Structure of a Fourth-Generation Catalyst" By Main Change, Zinshen Liu, Patricia J. Nelson, George R. Munzing, Thomas A. Gegan, Yury V. Kissin Dated Dec. 19, 2005, Journal of Catalysis 239 (2006) 347-352.

* cited by examiner

*Primary Examiner* — Roberto Rabago

(57) ABSTRACT

A solid catalyst component for olefin polymerization, and in particular for the preparation of LLDPE, comprising Mg, Ti, halogen and an electron donor compound (ID) belonging to cyclic ethers having 3-6 carbon atoms, characterized by having the molar ratio Mg/Ti higher than 5, the molar ratio Mg/ID lower than 3, and by a specific X-ray diffraction spectrum.

7 Claims, No Drawings

CATALYST COMPONENTS FOR THE POLYMERIZATION OF OLEFINS

This application is the U.S. National Phase of PCT International Application PCT/EP2011/063730, filed Aug. 10, 2011, which is a CIP of U.S. Non-Provisional Application No. 12/806,892, filed Aug. 24. 2010 (abandoned), and also claims priority of European Patent Application No. 10175027.1, filed Sep. 2, 2010, the contents of which are incorporated herein by reference in their entirety.

The present invention relates to catalyst components for the polymerization of olefins $CH_2=CHR$, wherein R is hydrogen or a hydrocarbon radical having 1-12 carbon atoms. In particular, the present invention relates to catalyst components comprising Mg, Ti, halogen and an electron donor compound in specified molar ratios. These catalyst components, when converted into a catalyst, are particularly suitable for the preparation of copolymers of ethylene with α-olefins due to their capability of homogeneously distribute the α-olefins along the polymer chain and among the various polymer chains.

Accordingly, another object of the present invention is the use of said catalysts in a process for the copolymerization of olefins in order to produce ethylene/α-olefin copolymers.

Linear low-density polyethylene (LLDPE) is one of the most important families of products in the polyolefin field. The family comprises ethylene/α-olefin copolymers containing an amount of α-olefin deriving units such as to have products with a density in the range 0.88-0.925. Due to their characteristics, these copolymers find application in many sectors and in particular in the field of wrapping and packaging of goods where, for example, the use of stretchable film based on LLDPE constitutes an application of significant commercial importance. LLDPE is commercially produced with liquid phase processes (solution or slurry) or via the more economical gas-phase process. Both processes involve the widespread use of Ziegler-Natta $MgCl_2$-supported catalysts that are generally formed by the reaction of a solid catalyst component, in which a titanium compound is supported on a magnesium halide, with a suitable activator usually an alkylaluminium compound.

As far as the preparation of LLDPE is concerned, said catalysts are required to show good comonomer distribution suitably coupled with high yields.

The homogeneous distribution of the comonomer (α-olefin) in and among the polymer chains is very important. In fact, having a comonomer randomly or alternatively distributed along the polymer chain and, at the same time, having the polymer fractions with a similar average content of comonomer (narrow distribution of composition) allows the achievement of high quality ethylene copolymers. These latter usually combine, at the same time, a density sufficiently low with respect to HDPE and a low content of polymer fractions soluble in hydrocarbon solvents like hexane or xylene which may worsen certain properties of the said copolymers.

Another desirable characteristic in the LLDPE film is the as low as possible amount of gel defects. Gels originate from a number of sources, including gels formed by crosslinking reactions during polymerization, insufficient mixing, homogenization during melt blending, and homogenization and crosslinking during film extrusion. Gels in general are undesirable because they affect negatively the film performance and appearance. For example, high gels may cause the film to break in the film production line or during subsequent stretching by converters.

In view of the above, it would be very important for the catalysts to be used in LLDPE preparation, particularly in gas-phase, to show a good ability to homogeneously distribute the comonomer as explained above and to produce a low content of gel defects.

In order to improve the capability of Ziegler-Natta catalysts in producing ethylene copolymer in which the comonomer is homogeneously distributed, it is commonly used a substantial amount of internal electron donor, in particular tetrahydrofurane (THF), in the solid catalyst component preparation.

In EP-A-004647 for example, is disclosed a catalyst component for the preparation of ethylene copolymers under gas-phase polymerization conditions, comprising a precursor of formula $Mg_mTi(OR)_nX_pED_q$, in which m is from 0.1 to 56, n is 0, 1 or 2, p is from 2 to 116 and q is from 2 to 85. Preferably m is from 1.5 to 5, q is from 4 to 11 and the ED is preferably chosen among esters, ethers and ketones, but among them tetrahydrofurane is the one preferred. The activities are not particularly high and supportation on silica is needed in order to impart the necessary morphological characteristics to the catalyst for the gas-phase operability.

WO2004/055065 discloses catalyst components for olefin polymerization, and in particular for the preparation of LLDPE, comprising Mg, Ti, halogen and an electron donor compound (ED) belonging to ethers, esters, amines, ketones, or nitriles in which the molar ratio Mg/Ti is higher than 5, and the molar ratio ED/Ti is higher than 3.5. Preferred internal donors are tetrahydrofurane and ethylacetate. The catalyst component containing THF shows ability to homogeneously distribute the comonomer only in combination with the use of trimethylaluminum as cocatalyst and THF as external donor and/or in the presence of high amounts of triethylaluminum/diethylaluminum chloride mixtures. In the latter case, the bulk density of the polymer is rather low even if the catalyst is prepolymerized, indicating that the catalyst has a poor morphological stability.

It is therefore felt the need of a catalyst showing, at the same time, ability to give a homogeneous comonomer distribution in ethylene polymers, low gel formation and a high polymerization activity coupled with morphological stability in gas-phase polymerization also in the absence of an external donor and without using the expensive trimethylaluminum.

The applicant has now found a solid catalyst component for olefin polymerization, and in particular for the preparation of LLDPE, comprising Mg, Ti, halogen and an electron donor compound (ID) belonging to cyclic ethers having 3-6 carbon atoms, and characterized by a molar ratio Mg/Ti higher than 5, a molar ratio Mg/ID lower than 3, and by an X-ray diffraction spectrum, in which, in the range of 2θ diffraction angles between 5.0° and 20.0°, at least three main diffraction peaks are present at diffraction angles 2θ of 7.2±0.2°, and 11.5±0.2° and 14.5±0.2° said peak at 2θ of 7.2±0.2° being the most intense one and the peak at 11.5±0.2° having an intensity less than 0.9 times the intensity of the most intense peak.

Preferably, in the X-ray diffraction spectrum, the intensity of the peak at 11.5° has an intensity less than 0.8 times, the intensity of the diffraction peak at 2θ diffraction angles of 7.2±0.2°.

Preferably, the intensity of the peak at 14.5°±0.2° is less than 0.5 times and more preferably less than 0.4 times the intensity of the diffraction peak at 2θ diffraction angles of 7.2±0.2°.

In a preferred embodiment, another diffraction peak is present at diffraction angles 2θ of 8.2±0.2° preferably having an intensity equal to or lower than the intensity of the diffraction peak at 2θ diffraction angles of 7.2±0.2°. Preferably, the intensity of the peak at diffraction angles 2θ of 8.2±0.2° is less than 0.9 and more preferably less than 0.5 times the intensity of the diffraction peak at 2θ diffraction angles of 7.2±0.2°.

In some cases is present also an additional broad peak at diffraction angles 2θ of 18.2±0.2° having intensity less than 0.5 times the intensity of the diffraction peak at 2θ diffraction angles of 7.2±0.2°.

Preferably, the ID compound is selected among cyclic ethers having 3-5 carbon atoms such as tetrahydrofurane, dioxane, methyltetrahydrofurane. Tetrahydrofurane is the most preferred. The Mg/ID molar ratio is preferably lower than 2.9, more preferably lower than 2.6, and especially lower than 2.1. In an especially preferred embodiment the Mg/ID molar ratio is lower than 2.

The Mg/Ti molar ratio ranges preferably from 7 to 50 and more particularly from 10 to 25. In a particular embodiment of the present invention, the catalyst component comprises, in addition to the electron donor compound (ID), a Ti compound and a magnesium dihalide in amounts such that the above disclosed molar ratios are satisfied. Preferred titanium compounds are the tetrahalides or the compounds of formula $TiX_n(OR^1)_{4-n}$, where $0 \leq n \leq 3$, X is halogen, preferably chlorine, and $R^1$ is $C_1$-$C_{10}$ hydrocarbon group. Titanium tetrachloride is the preferred compound.

The magnesium dihalide is preferably $MgCl_2$ in active form which is widely known from the patent literature as a support for Ziegler-Natta catalysts. Patents U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the ASTM-card reference of the spectrum of the non-active halide is diminished in intensity and broadened. In the X-ray spectra of preferred magnesium dihalides in active form said most intense line is diminished in intensity and replaced by a halo whose maximum intensity is displaced towards lower angles relative to that of the most intense line.

The catalyst components of the invention can be prepared according to several methods. One preferred method comprises the following steps: (a) contacting a titanium tetrahalide or a titanium compound of formula $TiX_n(OR^1)_{4-n}$, where $0 \leq n \leq 3$, X is halogen, and $R^1$ is $C_1$-$C_{10}$ hydrocarbon group with a $MgX_2(R"OH)_m$ adduct in which R" groups are $C_1$-$C_{20}$ hydrocarbon groups and X is halogen, in order to prepare an intermediate product, containing a titanium compound supported on Mg dichloride; (b) contacting an internal donor compound (ID) selected from cyclic ethers having 3-6 carbon atoms with the intermediate product, coming from (a) under conditions to have on the resulting solid an Mg/ID molar ratio lower than 3 and (c) subjecting the solid catalyst component coming from (b) to a thermal treatment carried out at a temperature from 70 to 150° C.

Preferred starting $MgX_2(R"OH)_m$ adducts are those in which R" groups are $C_1$-$C_{10}$ alkyl groups, X is chlorine and m is from 0.5 to 3 and more preferably from 0.5 to 2. Adducts of this type can generally be obtained by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Representative methods for the preparation of these spherical adducts are reported for example in U.S. Pat. No. 4,469,648, U.S. Pat. No. 4,399,054, and WO98/44009. Another useable method for the spherulization is the spray cooling described for example in U.S. Pat. Nos. 5,100,849 and 4,829,034.

Particularly interesting are the $MgCl_2 \cdot (EtOH)_m$ adducts in which m is from 0.15 to 1.5 and particle size ranging from 10 to 100 µm obtained by subjecting the adducts with a higher alcohol content to a thermal dealcoholation process carried out in nitrogen flow at temperatures comprised between 50 and 150° C. until the alcohol content is reduced to the above value. A process of this type is described in EP 395083.

The dealcoholation can also be carried out chemically by contacting the adduct with compounds capable to react with the alcohol groups.

Generally these dealcoholated adducts are also characterized by a porosity (measured by mercury method) due to pores with radius up to 1 µm ranging from 0.15 to 2.5 cm$^3$/g preferably from 0.25 to 1.5 cm$^3$/g.

In step (a) of the preferred method for preparing the solid catalyst components of the invention, the preferred dealcoholated adduct is reacted with the $TiX_n(OR^1)_{4-n}$ compound (or possibly mixtures thereof) mentioned above which is preferably titanium tetrachloride. The reaction with the Ti compound can be carried out by suspending the adduct in $TiCl_4$ (generally cold); subsequently the mixture is heated up to temperatures ranging from 80-130° C. and kept at this temperature for 0.5-2 hours. The treatment with the titanium compound can be carried out one or more times. Preferably it is carried out two times. At the end of the process the intermediate solid is recovered by separation of the suspension via the conventional methods (such as settling and removing of the liquid, filtration, centrifugation) and can be subject to washings with solvents. Although the washings are typically carried out with inert hydrocarbon liquids, it is also possible to use more polar solvents (having for example a higher dielectric constant) such as halogenated hydrocarbons. As mentioned above, the intermediate solid is, in step (b) brought into contact with the ID compound under conditions such as to fix on the solid an amount of donor such that the Mg/ID molar ratio is within the range previously disclosed. Preferably, the reaction is carried out under conditions such that the ID is added to the reaction mixture alone or in a mixture with other compounds in which it represents the main component in terms of molar amount. Although not strictly required the contact is typically carried out in a liquid medium such as a liquid hydrocarbon. The temperature at which the contact takes place can vary depending on the nature of the reagents. Generally it is comprised in the range from −10° to 150° C. and preferably from 0° to 120° C. It is clear that temperatures causing the decomposition or degradation of any specific reagents should be avoided even if they fall within the generally suitable range. Also the time of the treatment can vary in dependence of other conditions such as nature of the reagents, temperature, concentration etc. As a general indication, this contact step can last from 10 minutes to 10 hours more frequently from 0.5 to 5 hours. If desired, in order to further increase the final donor content, this step can be repeated one or more times. At the end of this step the solid is recovered by separation of the suspension via the conventional methods (such as settling and removing of the liquid, filtration, centrifugation) and can be subject to washings with solvents. Although the washings are typically carried out with inert hydrocarbon liquids, it is also possible to use more polar solvents (having for example a higher dielectric constant) such as halogenated or oxygenated hydrocarbons.

In the step (c) of the method, the solid product recovered from step (b) is subject to a thermal treatment carried out at temperatures ranging from 70 to 150° C., preferably from 80° C. to 130° C., and more preferably from 85 to 100° C.

The thermal treatment can be carried out in several ways. According to one of them the solid coming from step (b) is suspended in an inert diluent like a hydrocarbon and then subject to the heating while maintaining the system under stirring.

According to an alternative technique, the solid can be heated in a dry state by inserting it in a device having jacketed heated walls. While stirring can be provided by means of mechanical stirrers placed win said device it is preferred to cause stirring to take place by using rotating devices.

According to a still different embodiment the solid coming from (b) can be heated by subjecting it to a flow of hot inert gas such as nitrogen, preferably maintaining the solid under fluidization conditions.

The heating time is not fixed but may vary depending also on the other conditions such as the maximum temperature reached. It generally ranges from 0.1 to 10 hours, more specifically from 0.5 to 6 hours. Usually, higher temperatures allow the heating time to be shorter while, on the opposite, lower temperatures may require longer reaction times.

In the process as described each of the step (b)-(c) can be carried out immediately after the previous step, without the need of isolating the solid product coming from that previous step. However, if desired the solid product coming from one step can be isolated and washed before being subject to the subsequent step.

Generally, the particles of solid component have substantially spherical morphology and average diameter comprised between 5 and 150 μm, preferably from 10 to 100 As particles having substantially spherical morphology, those are meant wherein the ratio between the greater axis and the smaller axis is equal to or lower than 1.5 and preferably lower than 1.3. Generally, the solid catalyst components obtained according to the above method show a surface area (by B.E.T. method) generally between 10 and 200 $m^2/g$ and preferably between 20 and 80 $m^2/g$, and a total porosity (by B.E.T. method) higher than 0.15 $cm^3/g$ preferably between 0.2 and 0.6 $cm^3/g$. The porosity (Hg method) due to pores with radius up to 10.000 Å. generally ranges from 0.25 to 1 $cm^3/g$, preferably from 0.35 to 0.8 $cm^3/g$.

The so obtained catalyst component can be used as such or it can undergo a post-treatment with particular compounds suitable to impart to it specific properties. As an example, it can be subject to a treatment with a reducing compound for example an Al-alkyl compound, in order to lower the oxidation state of the titanium compound contained in the solid.

Another example of treatment that can be carried out on the intermediate is a pre-polymerization step. The pre-polymerization can be carried out with any of the olefins $CH_2=CHR$, where R is H or a $C_1$-$C_{10}$ hydrocarbon group. In particular, it is especially preferred to pre-polymerize ethylene or propylene or mixtures thereof with one or more α-olefins, said mixtures containing up to 20% in moles of α-olefin, forming amounts of polymer from about 0.1 g up to about 1000 g per gram of solid intermediate, preferably from about 0.5 to about 500 g per gram per gram of solid intermediate. The pre-polymerization step can be carried out at temperatures from 0 to 80° C., preferably from 5 to 70° C., in the liquid or gas phase. The pre-polymerization of the intermediate with ethylene or propylene in order to produce an amount of polymer ranging from 0.5 to 20 g per gram of intermediate is particularly preferred. The pre-polymerization is carried out with the use of a suitable cocatalyst such as organoaluminum compounds that can also be used in combination with one or more external donors that are below discussed in detail.

All the catalysts obtained generally show good performances in particular in the homopolymerization of ethylene and in its copolymerization with $C_3$-$C_{10}$ alpha olefins in order to produce ethylene alpha olefin copolymers containing up to 20% mol of alpha olefin. Suitable $C_{3-10}$ α-olefins include propylene, 1-butene, 1-hexene, and 1-octene, the like, and mixtures thereof. Preferably, the α-olefin is 1-butene, 1-hexene, or a mixture thereof. The amount of α-olefin used depends on the density of LLDPE desired. Preferably, the α-olefin is used in amount within the range of 5 to 10 wt % of ethylene. The density of LLDPE is preferably within the range of 0.88 to 0.940 $g/cm^3$, more preferably within the range of 0.910 to 0.940 $g/cm^3$, and most preferably within the range of 0.915 to 0.935 $g/cm^3$. The LLDPE preferably has a melt index $MI_2$ within the range of 0.1 to 10 dg/min, and more preferably within the range of 0.5 to 8 dg/min.

The catalyst of the invention were proven to be particularly suitable for production in gas-phase of LLDPE in which the comonomer is homogeneously distributed as evidenced by the low ratio between percentage of xylene solubles (XS) and weight percentage of comonomer. It is interesting to note that such good comonomer distribution is obtained together with very good values of bulk density and in the absence of an external donor.

Xylene solubles and hexane extractables directly affect the properties of LLDPE films and other products made from LLDPE. For instance, the LLDPE film blocking property depends on its xylene solubles or hexane extractables. In general, the higher the xylene solubles or hexane extractables are, the higher the film blocking is. Blocking is the tendency for films to adhere to on another as they are separated. Low xylene solubles or hexane extractables, i.e., low blocking, are therefore desired for all general-purpose films.

A particularly preferred LLDPE resin is a copolymer of ethylene and 1-butene having 1-butene content within the range of 5 to 10 wt %. The ethylene-1-butene copolymer preferably has a density from 0.912 to 0.925 $g/cm^3$ and, more preferably, from 0.915 to 0.920 $g/cm^3$. The ethylene-1-butene copolymer preferably has an $MI_2$ within the range of 0.5 to 15 dg/min and, more preferably, from 1 to 10 dg/min. Densities and $MI_2$ are determined in accordance with ASTM D1505 and D1238 (condition 190/2.16), respectively.

It has been found that using the catalyst of the invention it is possible to obtain an LLDPE showing, in addition to low amount of xylene and hexane extractables, a gel defect area less than or equal to 25 ppm, preferably less than or equal to 20 ppm. This finding is also described in the U.S. patent application Ser. No. 12/806,893.

The LLDPE of the invention can be used in many applications, including films, pipes, containers, adhesives, wire and cable, and molding parts. LLDPE having low xylene and hexane extractables and low gels is particularly useful for general purpose film applications. In particular the low gel allows the film to be stretched thinner without breaking. More particularly, the LLDPE with low gel is suitable for stretch wrap, clarity film such as bread bags, and shrink film applications in which the gel particles have significant impact on the film appearance, processing, and physical properties.

The solid catalyst components according to the present invention are converted into catalysts for the polymerization of olefins by reacting them with organoaluminum compounds according to known methods.

In particular, it is an object of the present invention a catalyst for the polymerization of olefins $CH_2=CHR$, in which R is hydrogen or a hydrocarbyl radical with 1-12 carbon atoms, comprising the product of the reaction between:
A. a solid catalyst component as described above,
B. an alkylaluminum compound and, optionally,
C. an external electron donor compound (ED).

The alkyl-Al compound can be preferably selected from the trialkyl aluminum compounds such as for example trimethylaluminum (TMA), triethylaluminum (TEAL), tri-isobutylaluminum (TIBA)), tri-n-butylaluminum, tri-n-hexylaluminum, tri-n-octylaluminum. Also alkylaluminum halides and in particular alkylaluminum chlorides such as diethylaluminum chloride (DEAC), diisobutylaluminum chloride, Al-sesquichloride and dimethylaluminum chloride (DMAC) can be used. It is also possible to use, and in certain cases preferred, mixtures of trialkylaluminums with alkyl-aluminum halides. Among them mixtures between TEAL and DEAC are particularly preferred. The use of TIBA, alone or in mixture is also preferred.

The external electron donor compound can be equal to or different from the ED used in the solid catalyst component. Preferably it is selected from the group consisting of ethers, esters, amines, ketones, nitriles, silanes and mixtures of the above. In particular it can advantageously be selected from the $C_2$-$C_{20}$ aliphatic ethers and in particulars cyclic ethers preferably having 3-5 carbon atoms cyclic ethers such as tetrahydrofurane, dioxane.

In addition to the aluminium alkyl cocatalyst (B) and the external electron donor (ED) (C), an halogenated compound (D) can be used as activity enhancer. Preferably, it is a mono or dihalogenated hydrocarbon. More preferably, it is chosen among monohalogenated hydrocarbons in which the halogen is linked to a secondary carbon atom. The halogen is preferably chosen among chloride and bromide.

Non limiting exemplary compounds (D) are propylchloride, i-propylchloride, butylchloride, s-butylchloride, t-butylchloride 2-chlorobutane, cyclopentylchloride, cyclohexylchloride, 1,2-dichloroethane, 1,6-dichlorohexane, propylbromide, and i-propylbromide, butylbromide, s-butylbromide, t-butylbromide, i-butylbromide i-pentylbromide, t-pentylbromide. Among them, particularly preferred are i-propylchloride, 2-chlorobutane, cyclopentylchloride, cyclohexylchloride, 1,4 dichlorobutane and 2-bromopropane.

The activity enhancer can be used in amounts such as to have the (B)/(D) molar ratio of higher than 3 and preferably in the range 5-50 and more preferably in the range 10-40.

The above mentioned components (A)-(D) can be fed separately into the reactor where, under the polymerization conditions can exploit their activity. It constitutes however a particular advantageous embodiment the pre-contact of the above components, optionally in the presence of small amounts of olefins, for a period of time ranging from 1 minute to 10 hours, preferably in the range from 2 to 7 hours. The pre-contact can be carried out in a liquid diluent at a temperature ranging from 0 to 90° C. preferably in the range of 20 to 70° C.

One or more alkyl aluminium compound or mixtures thereof can be used in the precontact. If more than one alkylauminum compound is used in the precontact, they can be used altogether or added sequentially to the precontact tank. Even if the precontact is carried out it is not necessary to add at this stage the whole amount of aluminium alkyl compounds. A portion thereof can be added in the pre-contact while the remaining aliquot can be fed to the polymerization reactor. Moreover, when more than one aluminium alkyl compound is used, it is also possible using one or more in the precontact and the other(s) fed to the reactor.

In one of the preferred embodiments, a precontact is carried out by first contacting the catalyst component with an aluminium trialkyl such as tri-n-hexyl aluminium (THA), then another aluminium alkyl compound, preferably, diethylaluminum chloride is added to the mixture, and finally as a third component another trialkylaluminum, preferably, triethylaluminum is added to the pre-contact mixture. According to a variant of this method, the last aluminium trialkyl is added to the polymerization reactor.

The total amount of aluminium alkyl compounds used can vary within broad ranges, but it preferably ranges from 2 to 10 mols per mole of internal donor in the solid catalyst component. In accordance with the disclosure of U.S. application Ser. No. 12/806,894 it has been found that the total amount of aluminium alkyl used with respect to the amount of cyclic ether on the catalyst component influences both the catalyst activity and the amount of xylene solubles and hexane extractables. In particular, for higher Al/donor ratios both the catalyst activity and the XS and hexane exctractables tend to increase. It is within the ordinary activity of the skilled in the art to reach the desired balance of properties choosing the specific ratio.

The so formed catalyst system can be used directly in the main polymerization process or alternatively, as explained previously, it can be pre-polymerized beforehand. The catalyst component so obtained can be used in any type of polymerization process but it is particularly suitable for gas-phase polymerization. They can work in any type of gas phase reactors that can be either fluidized or mechanically stirred bed. They can be used also in gas-phase reactors working under fast fluidization conditions. Non limitative examples of gas-phase processes wherein it is possible to use the catalysts of the invention are described in WO 92/21706, U.S. Pat. No. 5,733,987 and WO 93/03078.

The polymerization temperature ranges from 50 and 120° C., preferably between 60 and 100° C., while the operating pressure is between 0.5 and 10 MPa, preferably between 2.0 and 6 MPa.

As already mentioned, the catalysts of the present invention are particularly suitable for preparing linear low density polyethylenes (LLDPE, having a density lower than 0.940 g/cm$^3$) and very-low-density and ultra-low-density polyethylenes (VLDPE and ULDPE, having a density lower than 0.920 g/cm$^3$, to 0.880 g/cm$^3$) consisting of copolymers of ethylene with one or more alpha-olefins having from 3 to 12 carbon atoms, having a mole content of units derived from ethylene of higher than 80%. As shown in the examples below, said copolymers are generally characterized by low amount of xylene solubles fraction in respect of the extent of comonomer incorporation and density. In many cases, particularly when an external donor is used, the comonomer is also well distributed in and among the chain as shown by the low ratio between the percentage of xylene soluble fraction and the weight percentage of comonomer. The said catalysts can also be used to prepare a broader range of polyolefin products including, for example, high density ethylene polymers (HDPE, having a density higher than 0.940 g/cm$^3$), comprising ethylene homopolymers and copolymers of ethylene with alpha-olefins having 3-12 carbon atoms; elastomeric copolymers of ethylene and propylene and elastomeric terpolymers of ethylene and propylene with smaller proportions of a diene having a content by weight of units derived from ethylene of between about 30 and 70%. The following examples are given in order to further describe the present invention in a non-limiting manner.

CHARACTERIZATION

The properties are determined according to the following methods:

Melt Index: measured at 190° C. according to ASTM D-1238 condition "E" (load of 2.16 Kg) and "F" (load of 21.6 Kg);

Fraction soluble in xylene. The solubility in xylene at 25° C. was determined according to the following method: About 2.5 g of polymer and 250 mL of o-xylene were placed in a round-bottomed flask provided with cooler and a reflux condenser and kept under nitrogen. The mixture obtained was heated to 135° C. and was kept under stirring for about 60 minutes. The final solution was allowed to cool to 25° C. under continuous stirring, and was then filtered. The filtrate was then evaporated in a nitrogen flow at 140° C. to reach a constant weight. The content of said xylene-soluble fraction is expressed as a percentage of the original 2.5 grams.

Comonomer Content

1-Butene was determined via Infrared Spectrometry.

Effective density: ASTM-D 1505

X-Ray Determination

X-ray diffraction spectra were collected by using Bruker D8 Advance powder diffractometer. The spectra have been recorded by using the CuK$\alpha_1$($\lambda$=1,5405 Å) in the range of 2θ from 5° to 60° with incremental step of 0.2° and collection time of 12 seconds. During the acquisition of the X-ray pattern, the samples were enclosed into tailor made and air tight sample holder able to maintain the powders into $N_2$ atmosphere.

Determination of Mg, Ti: has been carried out via inductively coupled plasma emission spectroscopy (ICP).

Determination of Cl: has been carried out via potentiometric titration.

Determination of ID: via Gas-Chromatography analysis

Average Particle Size of the Adduct and Catalysts

Determined by a method based on the principle of the optical diffraction of monochromatic laser light with the "Malvern Instr. 2600" apparatus. The average size is given as P50.

Porosity and surface area with nitrogen: are determined according to the B.E.T. method (apparatus used SORPTOMATIC 1900 by Carlo Erba).

Porosity and surface area with mercury:

The measure is carried out using a "Porosimeter 2000 series" by Carlo Erba.

The porosity is determined by absorption of mercury under pressure. For this determination use is made of a calibrated dilatometer (diameter 3 mm) CD$_3$ (Carlo Erba) connected to a reservoir of mercury and to a high-vacuum pump (1·10$^{-2}$ mbar). A weighed amount of sample is placed in the dilatometer. The apparatus is then placed under high vacuum (<0.1 mm Hg) and is maintained in these conditions for 20 minutes. The dilatometer is then connected to the mercury reservoir and the mercury is allowed to flow slowly into it until it reaches the level marked on the dilatometer at a height of 10 cm. The valve that connects the dilatometer to the vacuum pump is closed and then the mercury pressure is gradually increased with nitrogen up to 140 kg/cm$^2$. Under the effect of the pressure, the mercury enters the pores and the level goes down according to the porosity of the material.

The porosity (cm$^3$/g), both total and that due to pores up to 1 μm, the pore distribution curve, and the average pore size are directly calculated from the integral pore distribution curve which is function of the volume reduction of the mercury and applied pressure values (all these data are provided and elaborated by the porosimeter associated computer which is equipped with a "MILESTONE 200/2.04" program by C. Erba.

Gel Defect Area

Gels in the films are measured with an optical scanning camera system mounted directly on the blown film line between the collapsing tower and the film winder. The film thickness is set to 50 microns (2 mil) during the gel measurement period and the optical scan is performed through the collapsed tubing, effectively scanning through two layers of the film for a total of 100 microns (4 mil). The gel measurement system used, including hardware and software, is a commercially available system provided by OCS GmbH, the Optical Control Systems film scanning system FS-5. FS-5 consists of a special high-speed digital area sensor and a lighting unit located in a separate protective housing. Transmission light is used to inspect transparent material, with the area sensor and the lighting unit installed opposite one another, inspecting the film which runs between them. The system facilitates the recognition of gels as optically recognizable defects in the film. The gels are distributed into predetermined class sizes. The defects are then assigned to the respective section of the strips. Software settings for the OCS gel analysis software are:

Camera: Pixels per line: 4096, Lines per frame: 256, Resolution: X-Axis 59 μm, Y-Axis 63 μm, Offsets: Left: 416 pixels, Right: 464 pixels Search Distance: Distance [Pixel]: 5, Maximum Pixel: 0

Level

1. Level neg.: 50
2. Level neg.: 5

Type of defects: contaminations With two levels

Shape Factors

Count: 3

Shape factor 1: 1.5

Shape factor 2: 2.5

Size Classes

Count: 5

Class 1: 100

Class 2: 200

Class 3: 400

Class 4: 800

Class 5: 1600

Grabber

Shading correction Mode: automatic Interval [mm]: 1000

Brightness: automatic Buffer size: 32

Grey value: 170

Matrix size X-Axis [Pixel]: 11

Y-Axis [Pixel]: 11

Filter

Parcel length [mm]: 96.768

Mean filter size: 50

Lanes

Count: 10

Limits

Limit mode: classical

Classical limits Minimum level: Level 0
Ratio level 1/Level 0: 0.5
Counter Mode
Area [m²]: 28.0
Start delay [s]: 0
Special defects
Count: 1

A standard report from the OCS gel analysis includes the number of gels or defects per unit area of the inspected film for each gel size of "defect size class". For example, in Table 1 the gel size classes are <100 microns, 100-200, 200-400, 400-800 and 800-1600 microns. The sum total of the cross sectional area of all gels, divided by the total area of inspected film, is also calculated and provided by the software as a "gel defect area", a dimensionless ratio in units of parts-per-million. The "gel defect area" is used herein as a quantitative measure of the gels in the film.

EXAMPLES

General Procedure for the Preparation of the Spherical $MgCl_2(EtOH)$ Adducts

An initial amount of microspheroidal $MgCl_2 \cdot 2.8C_2H_5OH$ was prepared according to the method described in Example 2 of WO98/44009 but operating on larger scale. The stirring conditions during the preparation were adjusted in order to obtain the desired average particle size. The so obtained microspheroidal $MgCl_2$-EtOH adduct was subjected to a thermal treatment under nitrogen stream over a temperature range of 50-150° C., to reduce the alcohol content. Using this method, the following solid support materials were obtained:

Adduct A—containing 28.5% wt of EtOH, having average particle size of 23 microns
Adduct B—containing 24.5% wt of EtOH, having average particle size of 63 microns General Procedure for the Gas-Phase Copolymerization of Ethylene and Butene A gas phase copolymerization of ethylene and butene is carried out in a small scale fluidized bed reactor, equipped with automized pressure and temperature control.

Firstly, the solid catalyst is precontacted for 15 minutes in hexane slurry at room temperature with trihexyl aluminum (THA), at THA/THF=0.19 molar. Subsequently, a diethyl aluminum chloride (DEAC) solution in hexane is added to the catalyst/THA slurry, such to have DEAC/THF=0.48 molar. The mixture is contacted for another 15 minutes at room temperature. Then, a triethyl aluminum (TEA) solution in hexane is added to the slurry, to meet the indicated molar ratio Al total/THF. Directly after the addition of the TEA, the precontact-slurry is discharged into the gas phase reactor that was prepared at the desired conditions before.

The gas phase reactor is controlled at a temperature of 86° C., and a pressure of 21 barg. The gas phase is composed of ethylene, hydrogen, butene and propane. The exact composition for the various tests are indicated in Table 2. After the introduction of the precontacted catalyst into the reactor (that initially does not contain any polymer bed), an ethylene/butene mixture (91/9 wt/wt) is continuously fed to the reactor in order to maintain constant pressure and composition in the reactor during the polymerization test. After two hours, the monomer feed is stopped, and the polymer bed formed during the polymerization run is discharged into a degassing vessel. The polymer is recovered and additionally degassed under vacuum.

Example 1

Preparation of the Solid Intermediate Component

Into a 500 mL four-necked round flask, purged with nitrogen, 250 mL of $TiCl_4$ were introduced at 0° C. Then, at the same temperature, 10 grams of above described spherical Adduct A were added under stirring. The temperature was raised to 130° C. and maintained at that temperature for 2 hours. Then, the stirring was discontinued, the solid product was allowed to settle and the supernatant liquid was siphoned off. A new amount of fresh $TiCl_4$ was added to the flask, such to reach the initial liquid volume. The temperature was maintained at 110° C. for 1 hour. Again, the solid was allowed to settle, and the liquid was siphoned off.

The solid was then washed three times with anhydrous hexane (100 mL at each washing) at 60° C. and twice at 40° C. Finally, the solid intermediate component was dried under vacuum and analyzed (Ti=4.2% wt; Mg=20.5% wt).

Contact With the ID

In a 500 mL four-necked round flask equipped with a mechanical stirrer and purged with nitrogen, 300 mL of anhydrous hexane and 21 g of the solid intermediate component obtained as described above were charged at room temperature. At the same temperature, under stirring THF was added dropwise, in an amount to charge a molar ratio Mg/THF=1.4. The temperature was raised to 50° C. and the mixture was stirred for 2 hours. Then, the stirring was discontinued, the solid product was allowed to settle and the supernatant liquid was siphoned off.

The solid was washed twice with anhydrous hexane (2×100 mL) at 40° C., recovered, dried under vacuum and analyzed.

Annealing

Into a 350 cm³ four-necked round flask, purged with nitrogen, 280 cm³ of heptane and 19.8 g of the solid obtained by the previous step were introduced at 25° C. Under stirring, the temperature was raised to 95° C. in about 30 minutes and maintained for 2 hours. Then, the temperature was decreased to 80° C., the stirring was discontinued, the solid product was allowed to settle for 30 minutes and the supernatant liquid was siphoned off.

The X-ray spectrum of the solid showed in the range of $2\theta$ diffraction angles between 5° and 20° one main diffraction line present at diffraction angles $2\theta$ of 7.2° (100), a side peak at 11.5 (60), another side peak at 14.5° (15) and an additional side peak at 18° (25); the numbers in brackets represent the intensity $I/I_o$ with respect to the most intense line.

The compositional results are reported in Table 1 while the catalyst performance in gas phase copolymerization of ethylene and butene are shown in Table 2.

Example 2

The procedures used for Example 1 were repeated with the difference that now during the adduction step of the ID, the THF was charged to the slurry in such an amount to charge a molar ratio Mg/THF=1.15.

The X-ray spectrum of the solid was similar to that of the catalyst of Example 1 with the difference that an additional side peak at 8.2° (40) was present. The numbers in brackets represent the intensity $I/I_o$ with respect to the most intense line.

The compositional results are reported in Table 1 while the catalyst performance in gas phase copolymerization of ethylene and butene are shown in Table 2.

Example 3

The procedures used for Example 1 were repeated with the difference that now during the adduction step of the ID, the THF was charged to the slurry in such an amount to charge a molar ratio Mg/THF=1.25.

The X-ray spectrum of the solid was similar to that of the catalyst of Example 2.

The compositional results are reported in Table 1 while the catalyst performance in gas phase copolymerization of ethylene and butene are shown in Table 2.

Example 4

The procedures used in Example 3 were repeated with the difference that the starting support used in titanation is now the Adduct B.

The X-ray spectrum of the solid was similar to that of the catalyst of Example 2.

The compositional results are reported in Table 1 while the catalyst performance in gas phase copolymerization of ethylene and butene are shown in Table 2.

Example 5

Preparation of the Solid Intermediate Component

The preparation of the solid intermediate component as described in Example 1 was repeated.

Contact With the ID, and Annealing

In a 500 mL four-necked round flask equipped with a mechanical stirrer and purged with nitrogen, 280 mL of anhydrous heptane and 21 g of the solid intermediate component obtained as described above were charged at room temperature. Then, 10 mL of a solution of cyclohexylchloride (CHC) in heptane were added dropwise, charging at a molar ratio Mg/CHC=3.2. Subsequently, 10 mL of a solution of THF in heptane were added dropwise, charging at a molar ratio Mg/THF=1.1.

After the addition, the temperature was raised to 95° C., and was maintained for 2 hours. Then the agitation was stopped, and the solid was allowed to settle. The supernatant liquid was siphoned off at 95° C., and the obtained solid was washed twice with hexane at 50° C. The obtained solid was dried under vacuum, and analyzed. The compositional results are reported in Table 1 while the catalyst performance in gas phase copolymerization of ethylene and butene are shown in Table 2.

Comparative Example 1

A catalyst component was prepared according to the description of Example 3, but omitting the annealing step.

In the X-ray pattern the main peaks at 7.2°, 11.5° and 14.5° were absent. The compositional results are reported in Table 1 while the catalyst performance in gas phase copolymerization of ethylene and butene are shown in Table 2.

Example 6

An LLDPE (ethylene-1-butene copolymer) is made in a gas phase polymerization process. The process uses a single fluidized bed reactor equipped with a gas recirculation compressor. The gas phase of the reactor is recycled with such a velocity that the polymeric bed in the reactor is kept in fluidized conditions. The gas phase comprises ethylene, 1-butene, hydrogen, nitrogen and isopentane. The ethylene concentration is controlled to have a high polymerization rate while maintaining polymer morphology (fines formation, sheeting, chunks formation, etc.), and is kept at about 30 mol %. The 1-butene to ethylene ratio is controlled in such a way that the density of the formed polymer is on target. The hydrogen to ethylene ratio is controlled in such a way that the molecular weight or $MI_2$ of the formed polymer is on target.

The catalyst component prepared according to example 3 is fed continuously to a preactivation section, where the catalyst is contacted with trihexylaluminum and diethylaluminum chloride. From the pre-activation section, the catalyst is continuously fed to said gas phase reactor. Apart from the pre-activated catalyst, triethylaluminum is continuously fed to the polymerization reactor system. The pressure in the reactor is kept at about 22 barg, while the polymerization temperature in the reactor is controlled to be 86° C. The LLDPE polymer is withdrawn from the reactor bed and degassed. The LLDPE obtained had a $MI_2$ of 0.87, a base resin density of 0.918, a gel defect area of 15 ppm, and % XS of 9.1.

TABLE 1

Compositions of the exemplified solids.

| | | Catalyst Composition | | | | |
|---|---|---|---|---|---|---|
| Ex. | Catalyst Preparation | Mg wt. % | Ti wt. % | ID wt. % | Mg/ID m.r | Mg/Ti m.r |
| 1 | Adduct A—Mg/THF = 1.4 | 16.1 | 2.0 | 26.3 | 1.81 | 15.6 |
| 2 | Adduct A—Mg/THF = 1.15 | 14.8 | 1.7 | 33.6 | 1.31 | 17.0 |
| 3 | Adduct A—Mg/THF = 1.25 | 15.7 | 1.6 | 31.1 | 1.49 | 19.1 |
| 4 | Adduct B—Mg/THF = 1.25 | 15.7 | 2.3 | 30.2 | 1.54 | 13.4 |
| 5 | Adduct A—Co-adduction of CHC & THF | 14.9 | 2.4 | 31.8 | 1.39 | 12.2 |
| C1 | As Example 3, but without annealing | 13.9 | 2.6 | 31.4 | 1.31 | 10.5 |

TABLE 2

Catalyst performance in gas phase copolymerization

| Catalyst | Polymerization Conditions*) | Mileage Kg/g | MIE g/10' | $C_4$ % wt | Density g/mL | Xylene Solubles % wt | Bulk Density g/mL |
|---|---|---|---|---|---|---|---|
| Ex. 1 | A | 9.7 | 0.56 | 7.5 | 0.919 | 7.9 | 0.428 |
| Ex. 2 | A | 7.7 | 0.82 | 6.7 | 0.920 | 5.4 | 0.427 |
| Ex. 3 | B | 12 | 0.8 | 6.9 | 0.919 | 7.3 | 0.393 |
| Ex. 4 | A | 3.9 | 1.7 | 9.7 | 0.916 | 15.4 | 0.395 |
| Ex. 5 | B | 13.9 | 0.94 | 7.3 | 0.918 | 7.5 | 0.370 |
| C1 | B | 14.8 | 0.71 | 6.6 | 0.922 | 7.4 | 0.358 |
| C2 | B | | | No catalyst activity | | | |

*) Polymerization conditions as described above, with the following particularities:
Condition A: 86° C., 21 barg, Al_total/THF = 4.8 molar, Ethylene = 25% mole, $H_2/C_2$ = 0.18, $C_4/C_2$ = 0.35
Condition B: 86° C., 21 barg, Al_total/THF = 5.5 molar, Ethylene = 30% mole, $H_2/C_2$ = 0.22, $C_4/C_2$ = 0.37

What is claimed is:
1. An olefin polymerization catalyst comprising:
   (A) a solid catalyst component comprising:
      (i) Mg,
      (ii) Ti,
      (iii) Cl, and
      (iv) an internal electron donor (ID) compound comprising a cyclic ether having 3-5 carbon atoms wherein the solid catalyst component has been subjected to thermal treatment at 70-150° C.,
   wherein the solid catalyst component consists essentially of:
      (i) a molar ratio Mg/Ti of 7-50,
      (ii) a molar ratio Mg/ID of 1.1-2.1, and
      (iii) an X-ray diffraction spectrum comprising at least three 2θ diffraction angle peaks between 5.0° and

20.0°, wherein the at least three 2θ diffraction angle peaks comprises a first 2θ diffraction angle peak of 7.2±0.2°, a second 2θ diffraction angle peak of 11.5±0.2°, and a third 2θ diffraction angle peak of 14.5±0.2°, wherein the first 2θ diffraction angle peak of 7.2±0.2° is the most intense and the second 2θ diffraction angle peak of 11.5±0.2° has an intensity less than 0.9 times the intensity of the first 2θ diffraction angle peak.

2. The catalyst of claim 1, wherein the second 2θ diffraction angle peak of 11.5±0.2° has an intensity less than 0.8 times the intensity of the first 2θ diffraction angle peak.

3. The catalyst of claim 1, wherein the X-ray diffraction spectrum comprises a fourth 2θ diffraction angle peak of 8.2±0.2° having an intensity less than 0.9 times the intensity of the first 2θ diffraction angle peak.

4. The catalyst of claim 1, wherein the X-ray diffraction spectrum comprise a fifth 2θ diffraction angle peak of 18.2±0.2° having an intensity less than 0.5 times the intensity of the first 2θ diffraction angle peak.

5. A process of preparing an olefin polymerization catalyst comprising the following steps:
(a) contacting a titanium tetrahalide or a titanium compound of formula $TiX_n(OR^1)_{4-n}$, where $0 \leq n \leq 3$, X is halogen, and $R^1$ is $C_1$-$C_{10}$ hydrocarbon group with a $MgX_2(R"OH)_m$ adduct in which R" groups are $C_1$-$C_{20}$ hydrocarbon groups, m is from 0.5 to 3, and X is halogen, to produce an intermediate product, containing a titanium compound supported on Mg dichloride;
(b) contacting an internal donor compound (ID) selected from cyclic ethers having 3-5 carbon atoms with the intermediate product of step (a) to produce a solid catalyst component; and
(c) subjecting the solid catalyst component of step (b) to a thermal treatment carried out at a temperature from 70 to 150° C. to produce the olefin polymerization catalyst of claim 1.

6. The process of claim 5, wherein the thermal treatment is carried out at a temperature from 80 to 130° C.

7. A process comprising:
(co)polymerizing an olefin of the formula, $CH_2$=CHR, to produce a polymer, wherein R is hydrogen or a hydrocarbon radical having 1-12 carbon atoms, and wherein the (co)polymerizing step is carried out in the presence of the olefin polymerization catalyst according to claim 1.

* * * * *

UNITED STATES PATENT AND TRADEMARK OFFICE
CERTIFICATE OF CORRECTION

PATENT NO. : 10,155,825 B2
APPLICATION NO. : 13/818626
DATED : December 18, 2018
INVENTOR(S) : Pater et al.

Page 1 of 1

It is certified that error appears in the above-identified patent and that said Letters Patent is hereby corrected as shown below:

On the Title Page

Item (56), under 'other publications', Line 3, delete "Scitentific" and insert -- scientific --
Item (56), under 'other publications', Line 9, delete "Zinshen" and insert -- Zizhen --

In the Specification

In Column 1, Line 25, delete "ethylene/cc-olefin" and insert -- ethylene/a-olefin --
In Column 1, Line 42, delete "alkylaluminium" and insert -- alkylaluminum --
In Column 5, Line 38, delete "100" and insert -- 100 μm --
In Column 5, Line 66, after "500 g" delete "per gram per gram" and insert -- per gram --
In Column 6, Line 41, after "adhere to" delete "on"
In Column 8, Line 31, delete "exctractables" and insert -- extractables --
In Column 9, Line 37, delete "2θfrom" and insert -- 2θ from --

In the Claims

In Column 15, Line 18, Claim 4, delete "comprise" and insert -- comprises --

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*